Aug. 23, 1932.  J. L. DRAKE  1,872,698
METHOD AND APPARATUS FOR PRODUCING SHEET GLASS
Filed Nov. 30, 1928
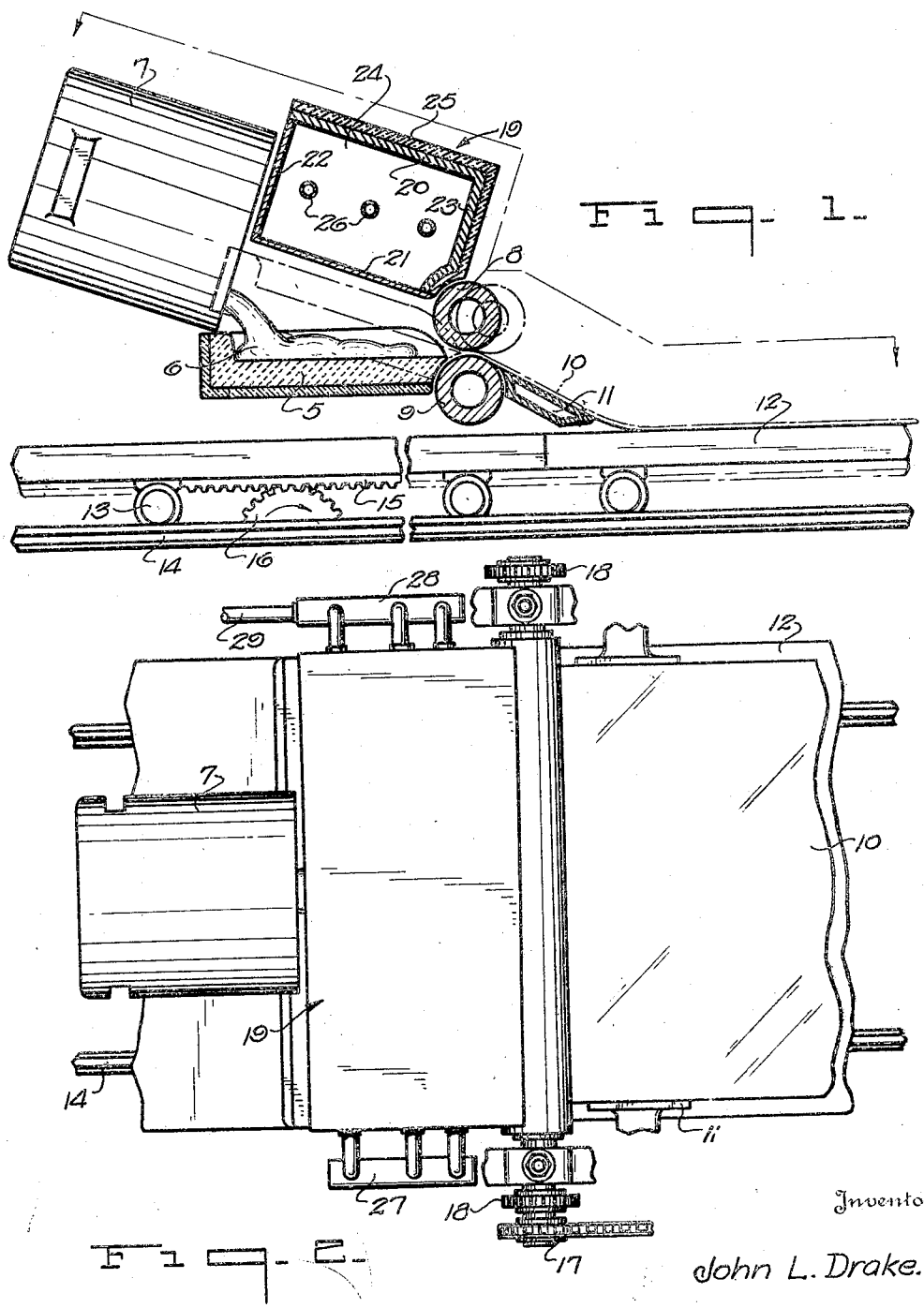
Inventor
John L. Drake.
By Frank Fraser
Attorney Patented Aug. 23, 1932

1,872,698

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed November 30, 1928. Serial No. 322,629.

This invention relates broadly to the manufacture of sheet or plate glass and more particularly to that method wherein a relatively large mass or charge of molten glass is initially deposited upon a receiver or support from which it is subsequently moved to a pair of forming rolls and reduced thereby to a sheet of substantially predetermined and uniform thickness.

Ordinarily, in such method above referred to, the molten glass is preferably melted and refined in a suitable receptacle or pot and the entire contents of this pot deposited upon the receiver before any of the glass is moved to the forming rolls. It has been found that during the pouring of the glass from the pot onto the receiver and during that period of time the glass rests upon the latter, a considerable amount of heat is dissipated from the glass by radiation with the result that the outer and principally the upper layer thereof becomes chilled and is therefore somewhat cooler than the remaining glass when passed to the forming rolls. This uniform temperature of the glass as it passes to the forming rolls is obviously an undesirable condition since the colder portions of the glass mixing with the hotter portions is very apt to result in defects in the finished sheet or plate. Heat is not only dissipated from the glass while on the receiver but likewise from the mouth of the pot as the glass is poured therefrom.

The principle object of the present invention is to avoid the above objectionable features in the production of sheet or plate glass by the method described to the end that the molten glass passing to the forming rolls will be of a more nearly uniform temperature throughout with the result that the rolling operation will be facilitated and the quality of the finished sheet or plate improved.

Another object of the invention resides in the provision of an improved method and means for controlling the temperature of the molten glass as it is deposited upon the receiver and more particularly for minimizing heat loss through radiation from the mass of molten glass prior to its passage to the forming rolls.

A further object is the provision of a method and means of the above character for reflecting heat into the inside of the pot and on top of the molten glass on the receiver in sufficient volume to overcome or minimize the heat loss through radiation and preferably without resulting in the addition of any heat to the glass.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through apparatus provided by the present invention and shown as applied to one type of sheet forming mechanism, and Fig. 2 is a top plan view thereof.

Referring to the drawing, 5 designates a receiver or support adapted to have deposited thereupon a mass or charge of completely refined molten glass 6 from a pot or receptacle 7. A pair of forming rolls 8 and 9 are positioned in advance of the receiver and are spaced from one another to create a sheet forming pass therebetween through which the molten glass 6 is moved and reduced to a sheet of substantially predetermined and uniform thickness. The sheet is herein designated 10 and as it issues from between the forming rolls, the same is adapted to pass downwardly over an inclined runway 11 onto one or a series of tables 12, or other suitable supporting and conveying mechanism, by which the sheets are carried to an annealing leer. While the tables or other conveying mechanism may be driven in any suitable manner, the tables herein illustrated are carried by wheels 13 which run upon tracks 14. Carried by the underside of the tables 12 are rack bars 15 engageable by a drive pinion 16. Upon rotation of the drive pinion, the tables can be moved beneath the forming mechanism to receive the sheets thereupon. One of the forming rolls is positively driven such as through a sprocket and chain drive 17 and the shafts of the forming rolls each carry gears 18 which mesh with one another so that the second roll can be driven from the positively driven roll.

The receiver 5 is adapted to be of such a size that the entire contents of the pot 7 may be deposited thereupon before any of the glass is moved to the forming rolls. The molten glass is adapted to be deposited upon the receiver while the same is in a substantially horizontal position as indicated by the full lines in Fig. 1. After the entire contents of the pot has been deposited upon the receiver, the pot is removed and the receiver tilted upwardly to the position indicated by the broken lines so as to advance the molten glass to the forming rolls.

As brought out above, the aim of the present invention is broadly to control the temperature of the molten glass on the receiver 5 and more particularly to overcome or minimize as much as possible the loss of heat from the glass by radiation during the pouring of the glass from the pot onto the said receiver and during that period of time the glass rests upon the latter. To this end, there is provided a heating member designated in its entirety by the numeral 19, said member comprising a rectangular casing mounted above the receiver 5 and extending substantially the entire length and width thereof. This casing comprises the top and bottom walls 20 and 21, the side walls 22 and 23 and the end walls 24. The bottom and side walls 21 and 22 respectively are preferably constructed of nichrome or some similar metal while the top and side walls 20 and 23 respectively and the end walls 24 are preferably backed by a layer of suitable insulating material 25. Extending longitudinally through the casing are a plurality of burner pipes 26 connected at their opposite ends, outside of the casing, with the manifolds or headers 27 and 28. Leading from the header 28 is a pipe 29 having connection with a suitable source of supply. Of course, any desired type of heating means may be utilized such as for instance, electrical heating units might be substituted for burners 26. On the other hand, the walls 21 and 22 of the casing may be such that they can be heated by the passage of an electric current therethrough.

In practice, during the pouring of the molten glass from the pot onto the receiver and during the time the glass is permitted to rest upon the latter, the heating member 19 is adapted to reflect heat into the inside of the pot 7 and on top of the molten glass 6 so as to overcome or minimize as much as possible the loss of heat from the glass by radiation. More specifically, the wall 21 is adapted to reflect heat downwardly on top of the molten glass on the receiver while the wall 22 will reflect heat into the inside of the pot.

After the entire contents of the pot has been deposited upon the receiver and the pot removed, the receiver is tilted upwardly to the position indicated by the broken lines in Fig. 1 and the molten glass passed to the forming rolls. The heating member 19 is arranged at an angle to the horizontal as illustrated in the drawing to permit the upward tilting of the receiver when it is desired to pass the molten glass to the forming rolls.

With the arrangement above described, it will be apparent that the heating member 19 serves to control the temperature of the molten glass as it is poured from the pot onto the receiver and during the time it is in contact with the latter. By preventing or minimizing heat loss through radiation, the molten glass passing to the forming rolls will be of a more nearly uniform temperature throughout. It is preferred that the heating member 19 be so controlled that it will overcome heat loss by radiation without adding any additional heat to the glass. On the other hand, however, the heating member can also be controlled to raise the temperature of the glass if it is found desirable without departing from the spirit of the invention. Broadly stated, this invention seeks to control the temperature of the molten glass during the pouring thereof onto the receiver and while it is upon the latter in one way or another.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In the manufacture of sheet or plate glass, the steps consisting in depositing a charge of molten glass upon a supporting surface, subsequently tilting said surface to pass the glass therefrom, in reducing the glass to sheet form as it leaves said surface, and in directing heat upon the top of the glass while on said surface in volume sufficient only to overcome heat loss by radiation without resulting in any addition of heat to said glass.

2. In the manufacture of sheet or plate glass, the steps consisting in pouring a mass of molten glass from a receptacle onto a supporting surface, subsequently passing the glass from the surface and reducing it to sheet form, and in retarding radiation heat loss from the glass during the pouring thereof from said receptacle onto said surface and during that period of time it rests upon the latter.

3. In the manufacture of sheet or plate glass, the steps consisting in pouring a mass of molten glass from a receptacle onto a supporting surface, subsequently passing the glass from the surface and reducing it to sheet form, and in reflecting heat into the inside of the receptacle and downwardly upon the glass on said supporting surface during the pouring of the glass from the former onto the latter.

4. In the manufacture of sheet or plate glass, the steps consisting in pouring a mass of molten glass from a receptacle onto a supporting surface, subsequently passing the glass from the surface and reducing it to sheet form, and in reflecting heat into the inside of the receptacle and downwardly upon the top of the glass on said supporting surface in volume sufficient only to overcome heat loss from the glass by radiation without resulting in any addition of heat thereto.

5. In combination in apparatus for intermittently producing sheet or plate glass, tiltable supporting means for periodically receiving a mass of molten glass thereupon, means for receiving the glass from the supporting means and reducing it to sheet form, and stationary heating means mounted above and in proximity to the supporting means and adapted to overcome radiation heat loss from the glass thereon.

6. In combination in apparatus for intermittently producing sheet or plate glass, a tiltable supporting member adapted to intermittently receive thereupon a mass of molten glass, a pair of forming rolls for receiving the glass from the supporting member and reducing it to sheet form, and stationary heating means mounted above said supporting member.

7. In combination in apparatus for producing sheet or plate glass, a tiltable supporting member adapted to receive thereupon a mass of molten glass, a pair of forming rolls for receiving the glass from the supporting member and reducing it to sheet form, and a stationary heating member mounted in a fixed position above the supporting member and inclined at an angle to the horizontal to permit upward tilting movement of said supporting member, the length and width of said heating member being substantially equal to that of the supporting member.

8. In combination in apparatus for intermittently producing sheet or plate glass, a tiltable supporting member adapted to intermittently receive thereupon a mass of molten glass, a pair of forming rolls for receiving the glass from the supporting member and reducing it to sheet form, a stationary heater mounted in a fixed position above said member, and means for internally heating said heater whereby to deflect heat downwardly upon the top of the molten glass on said supporting surface.

9. In combination in apparatus for producing sheet or plate glass, supporting means, a receptacle containing a mass of molten glass and adapted to be tilted above the supporting means to cause the glass to flow thereupon, means for receiving the glass from the supporting means and reducing it to sheet form, and heating means mounted above the supporting means and adapted to reflect heat into the inside of the receptacle and downwardly upon the glass on said supporting means during the flowing of the glass from the former onto the latter.

10. In combination in apparatus for producing sheet or plate glass, a supporting member, a receptacle containing a mass of molten glass and adapted to be tilted above the supporting member to cause the glass to flow thereupon, a pair of forming rolls for receiving the molten glass from the supporting member and reducing it to sheet form, and a heater mounted above the supporting member and adapted to reflect heat into the inside of the receptacle and downwardly upon the glass on said supporting member during the flowing of the glass from the former onto the latter.

11. In combination in apparatus for producing sheet or plate glass, a supporting member, a receptacle containing a mass of molten glass and adapted to be tilted above the supporting member to cause the glass to flow thereupon, a pair of forming rolls for receiving the molten glass from the supporting member and reducing it to sheet form, and means for controlling the temperature of the molten glass within said receptacle and upon said supporting member as the glass is flowed from the former onto the latter.

12. In combination in apparatus for producing sheet or plate glass, a tiltable supporting member, a receptacle containing a mass of molten glass and adapted to be tilted above the supporting member to cause the glass to flow thereupon, a pair of forming rolls for receiving the molten glass from the supporting member and reducing it to sheet form, and an internally heated member mounted above the supporting member and adapted to reflect heat into the inside of the receptacle and downwardly upon the glass on said supporting member during the flowing of the glass from the former onto the latter, said heating member being inclined at an angle to the horizontal to permit upward tilting of said supporting member.

13. In combination in apparatus for producing sheet or plate glass, a tiltable supporting member adapted to receive thereupon a mass of molten glass, a pair of forming rolls for receiving the glass from the supporting member and reducing it to sheet form, a stationary heating member mounted above the supporting member and inclined at an angle to the horizontal to permit upward tilting movement of said supporting member, and means for internally heating said heating member.

14. In combination in apparatus for producing sheet or plate glass, a tiltable supporting member adapted to receive thereupon a mass of molten glass, a pair of forming rolls for receiving the glass from the supporting member and reducing it to sheet form, a stationary heating member mounted above the supporting member and arranged at an angle to the horizontal such that the bottom thereof will be substantially parallel with said supporting member when the latter is tilted upwardly to cause the molten glass to flow therefrom to the sheet forming rolls.

15. In combination in apparatus for producing sheet or plate glass, a tiltable supporting member adapted to receive thereupon a mass of molten glass, a pair of forming rolls for receiving the glass from the supporting member and reducing it to sheet form, a stationary heating member mounted above the supporting member and including a substantially rectangular casing extending substantially the entire length and width of the supporting member and inclined at an angle to the horizontal, and a receptacle containing a mass of molten glass and adapted to be tilted above the supporting member to cause the glass to flow therefrom, the adjacent side wall of said casing being arranged to cover a substantial portion of the mouth of said receptacle when the same is tilted to flow the molten glass therefrom.

Signed at Toledo, in the county of Lucas and State of Ohio, this 27th day of November, 1928.

JOHN L. DRAKE.